Oct. 4, 1949.  E. E. CATER  2,483,572
VALVE
Filed Nov. 6, 1944
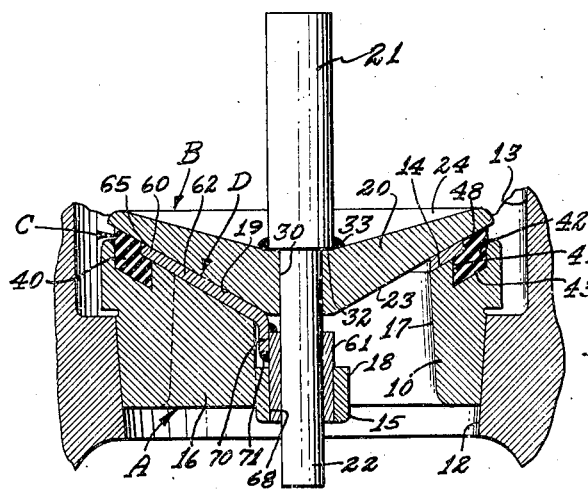
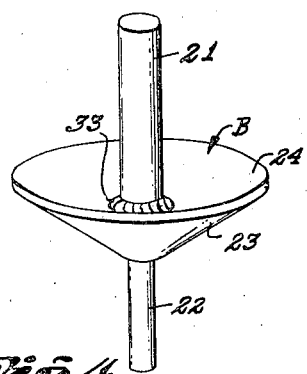
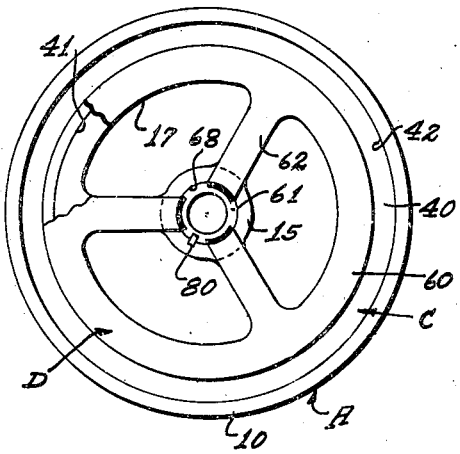
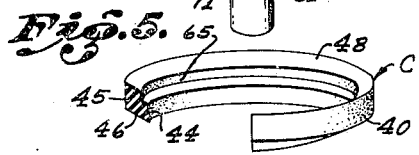
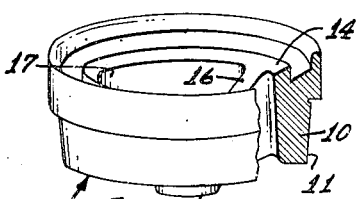
INVENTOR
EARL E. CATER
BY
ATTORNEY Patented Oct. 4, 1949

2,483,572

UNITED STATES PATENT OFFICE 2,483,572

VALVE

Earl E. Cater, Los Angeles, Calif.

Application November 6, 1944, Serial No. 562,136

4 Claims. (Cl. 251—127)

This invention has to do with a valve and is more particularly concerned with a valve for a slush pump, or the like. It is a general object of the present invention to provide a valve of the type referred to which is simple and inexpensive of manufacture, highly efficient in operation, and simple and convenient to repair.

Slush pumps such as are used extensively in various pumping operations are characterized by valves each of which involves a seat element that is mounted in fixed position in the pump and a working part or valve proper which cooperates with the seat. The seat supports the valve and sealing means is provided usually in the form of a sealing ring to seal between the valve and seat to prevent leakage between them.

Under operating conditions the engaging parts of a slush pump valve wear and deformation of parts occurs. The result of these conditions is improper cooperation of the valve and seat resulting in excessive wear of the sealing means with the result that replacement of the parts becomes necessary. With the ordinary valve construction when replacement is necessary the seat must be removed from the pump, which operation is generally difficult to perform and is often time consuming and costly.

A general object of my present invention is to provide a valve structure or more specifically a slush pump valve construction involving replaceable or renewable wearing parts. With the construction that I have provided the parts which are commonly subject to the most wear are renewable without removal of the seat from the pump.

Another object of this invention is to provide a valve structure of the general character referred to in which the several parts are simple and inexpensive of manufacture as well as being easy to handle and highly efficient in operation.

It is another object of this invention to provide a valve structure of the general character mentioned in which the valve element proper is of extremely simple form and construction. With my construction the valve proper is free of sealing means or other structural complications with the result that it is extremely simple in form and is inexpensive of manufacture, making it practical for replacement when wear occurs.

Another object of this invention is to provide a valve construction of the character referred to in which the valve proper is not only simple in form but is light in weight so that the impact factor which causes wear and distortion of parts is minimized, thus prolonging the life of the structure generally.

Another object of my invention is to provide a valve structure of the general character referred to in which the sealing ring that acts to seal between the seat and valve proper is carried by the seat and is engaged by the replaceable wearing part that I have provided. In the preferred construction the replaceable wearing part of the present invention retains the sealing ring in the seat and when the wearing part is removed for replacement the sealing ring is exposed so that it can be readily removed and renewed.

It is another object of this invention to provide a valve structure of the general character referred to in which the wearing part that I have provided is formed mainly of a stamping making it suitable for inexpensive manufacture in quantities so that it can be replaced at little cost with the result that the valve can be inexpensively maintained in a highly efficient condition.

The various objects and features of my invention will be fully understood from the following detailed description of a typical preferred form and application of my invention, throughout which description reference is made to the accompanying drawings, in which:

Fig. 1 is a detailed transverse sectional view of a slush pump valve embodying the present invention showing the manner in which it mounts in a pump, or the like. Fig. 2 is a plan view of the seat assembly provided by the present invention separate from the other parts and with certain portions broken away. Figs. 3 to 6 are perspective views illustrating the several parts of the structure in separated relationship and in the order in which they are arranged in the finished structure, Fig. 3 being a perspective view of the valve element proper, Fig. 4 being a perspective view of the wear taking part provided by the present invention, Fig. 5 being a perspective view of the sealing ring with a portion broken away to show its cross sectional configuration, and Fig. 6 is a perspective view of the valve seat proper with a part broken away to show its cross sectional configuration.

The valve to which the present invention is applied involves, primarily, three essential elements, namely, a seat A, a working element or valve B, and sealing means C. My present invention provides primarily a fourth element, namely a wear taking element D acting in combination with the primary elements A, B and C.

The seat A may be of the general form or type employed in slush pump valves. The seat shown in the drawings involves, generally, an annular body 10 having an outer tapered wall 11 and a pitched top face to oppose the valve B. The seat is adapted to be mounted in a pump so that it is stationary or fixed and in Fig. 1 of the drawings I have shown it in working position in a tapered bore 12 provided in the valve chamber 13 of a pump. The tapered exterior or outer side 11 of the seat body 10 is tapered to fit tightly in the bore 12 of the pump in the manner common in slush pump valve construction. In the preferred design the body 10 projects somewhat above the tapered outer side 11 to have a somewhat enlarged upper end portion, the top of which is finished to form the top face 14 of the seat. I prefer to pitch or incline the top face 14 of the seat so that it extends straight down and in from the perimeter of the body at an angle of about 25 degrees, as shown in the drawings.

The seat element A includes, in addition to the body 10, a valve stem guide 15 held centrally in the annular body 10 by a web support. In the preferred arrangement the valve stem guide is a ring-like part supported concentric with the annular body 10 of the seat and at a point at or near the lower end portion of the body. The web support for the valve stem guide 15 serves to rigidly support the guide in the body and may involve one or more radial ribs 16, such as I have shown in the drawings. In the preferred construction the body 10, stem guide 15 and ribs 16 are integrally joined to form a rigid unitary structure. In practice this part or unit can be cast or forged. In the design disclosed there are three ribs 16 that project radially inward from the inner wall 17 of the seat body 10 to join the outer wall 18 of the ring-like valve stem guide 15. In accordance with my invention the upper edge or face 19 of each rib 16 adjoins the top face 14 of the valve body 10 and forms a downwardly and inwardly extending continuation of the top face 14, that is, the top faces of the ribs are finished to be in the same plane and to extend at the same angle as the top face 14.

The valve B which is the working element of the structure, involves, generally, a head and a stem. The head of the valve is a disc-like member 20 while the stem is located concentric with the head and has an upper end portion 21 projecting upwardly from the head and a lower end portion 22 projecting downwardly from the head. The lower end portion 22 of the stem depends from the head to be guided by the stem guide 15 of the seat.

In accordance with my invention the valve head 20 is of general concavo-convex formation, being formed with a downwardly and inwardly pitched lower face 23 and a downwardly and inwardly pitched upper face 24. The lower face 23 of the valve head is conical and formed at an angle corresponding to the angle of the top faces 14 and 19 of the valve seat body and webs 16. The top side or face 24 of the valve head extends downwardly and inwardly at an angle pitched somewhat less than the bottom face 23 so that the valve head varies in thickness between its center and perimeter, the outer or peripheral portion being considerably thinner than the center or hub portion, as clearly shown in Fig. 1 of the drawings.

The head 20 of the valve is made of such size or diameter as to overlie the top face 14 of the valve seat. In fact, in practice, the valve head can be made to be substantially the same in outside diameter as the valve seat body 10. In the case illustrated in the drawings the valve head is slightly smaller in diameter than the seat body 10.

The valve stem as a whole, or either portion thereof, may be formed integrally with the head 20 or the entire valve stem may be a unit formed separately from the valve head and attached thereto through a suitable connection, as shown in Fig. 1. In the preferred form of the invention the valve head 20 is formed with a central bore 30 and the upper end portion of the stem above the body 20 is formed of a diameter somewhat larger than the bore 30 while the lower end portion 22 of the stem depending from the portion 21 is formed to pass through and fit the bore 30. The shoulder 32 of the stem formed between the portions 21 and 22 rests on the top of the body 20 surrounding the bore 30. In practice any suitable means may be provided for securing the head 20 and stem together. It is advantageous in practice to weld these parts together as by an annular body of welding 33 applied around one end of the valve where the stem issues therefrom. In the case illustrated I have shown one body of welding 33 applied between the top side 24 of the body 20 and the upper portion 21 of the stem. The body of welding not only secures the stem and the head together but seals these parts against leakage between them.

With the valve construction just described the head can be made of a material most suited for the service it must perform, whereas the stem can be formed of a material and can be finished to most advantageously perform its function. Furthermore, it will be apparent that the construction that I have provided is extremely simple and inexpensive of manufacture. The valve head 20 can be very easily and inexpensively manufactured as it requires only two finished parts, namely the lower working part 23 and the bore 30, while the stem is obviously a very simple part being a simple turning with two straight sections. Further, the method of joinder that I have provided, namely, the single ring of welding 33, is not only highly efficient but is simple and inexpensive.

The sealing means B may, in accordance with the broader principles of my invention, be on one of the principal elements A or B to cooperate with the other of said elements. In the case illustrated and in the preferred form of the invention I make the sealing means in the form of a sealing ring 40 of rubber, or the like, and I support it in or from the seat A so that it is stationary. In the preferred form the sealing ring 40 fits a groove or channel provided in the top face 14 of the seat body 10. The groove as shown in the drawings has vertical or axial inner and outer side walls 41 and 42, respectively, and a bottom wall 43 which is pitched at the same angle as the face 14. The ring 40 has inner and outer vertical or axial side walls 44 and 45, respectively, that fit the walls 41 and 42, as shown in Fig. 1 of the drawings. The bottom wall 46 of the sealing ring is pitched and seats on the pitched bottom wall 43 of the groove in the face 14. The sealing ring 40 is proportioned to project somewhat above the face 14 to present a top sealing face 48 parallel with the face 14 but spaced somewhat above it. The sealing ring is a continuous annular body of rubber, or the like, and is proportioned to fit tightly into the groove or channel provided in the seat body 10.

The wear taking element D provided by my present invention is designed to be used in connection with the elements above described to take the bulk of the wear that occurs in the structure, and is such that it can be readily removed and replaced when excessive wear has occurred. The wear taking element involves primarily an annular seat ring 60 to be on the top of the seat body 10 or on the face 14 to act between the top of the seat body and the valve head 20, and a liner 61 to act between the valve stem and the valve stem guide. In the preferred form of the invention the wear taking member also includes ribs 62 which overlie and protect the ribs 16 of the valve seat and also serve to join the ring 60 with the liner 61.

The ring of the wear taking element fits over and rests upon the top face 14 of the seat body 10 inward of the sealing ring 40 and preferably occupies the entire top face 14 inward of the ring 40. In accordance with my invention the ring 60 is sufficiently large to overlie the inner portion of the ring 40 and the ring 40 at its upper inner corner is notched at 65 to receive the outer peripheral portion of the ring 60, so that the ring 60 overlies the packing ring 40 and serves to positively retain it in the groove in the seat body 10. The ring 60 has parallel upper and lower faces 66 and 67, respectively, pitched at the same angle as the face 14 of the seat body 10 and the face 23 of the valve head 20. By thus forming the wear taking ring 60 it seats tightly and firmly on the seat body 10 and forms an effective bearing support for the valve body 20.

The liner 61 of the wear taking element is a sleeve-like part to act somewhat as a bushing for the valve stem guide 15 of the seat A. In practice this part may be a simple tubular part made to fit closely in the bore 68 of the valve stem guide 15 and having a bore 71 finished to fit or receive the lower section 22 of the stem with the desired working clearance. In the preferred arrangement the liner projects somewhat above the guide 15 so that it affords a long bearing support for the stem section 22 and is exposed for effective joinder with the ribs 62 as hereinafter described.

The ribs 62 of the wear taking element correspond in number and arrangement to the ribs 16 of the seat A and extend down and in from the ring 60 to points immediately beyond or inward of the ribs 16. In accordance with the preferred construction each rib 16 corresponds in thickness and pitch with the ring 60 so that it accurately seats or bears on the top face 19 of a rib 16 and forms a support for the valve head 20 when the valve is closed, as shown in Fig. 1.

In practice the ribs 62 and liner 61 can be joined in various manners. In the preferred arrangement illustrated I provide a downwardly turned ear 70 on the inner end of each rib 62 and these ears extend down around the upper end portion of the liner which projects above the guide 15 and are joined to the liner by welding 71.

In practice the wear taking element that I have provided may be of very simple inexpensive construction. For instance, the ring 60 and the ribs 62 may be formed integrally. In the drawings I have shown a construction which is such that these parts can be readily formed or stamped from sheet material. The liner 61 can be simple tubular stock and the connection that I have provided between the liner and the ribs involves merely a simple welding operation.

In use the seat A is arranged in a pump, as indicated in Fig. 1, so that the body 10 is rigid in the pump and the sealing ring 40 is tight in the groove provided in the top of the body 10. The wear taking element D is arranged in connection with the seat A so that the ring 60 seats on the upper face 14 while the ribs 62 rest on the faces 19 of the ribs 16 at the same time that the liner 61 fits the guide 15. The sealing ring 40 is preferably proportioned to project somewhat above the top face 66 of the wear taking element so that when the valve head moves down into engagement with the stationary parts it engages the sealing ring and is sealed before it is positively mechanically supported by the metal parts. The proper register of the ribs 62 with the ribs 16 may be assured through any suitable construction. In the case illustrated I have shown a key 80 provided between the guide 15 and the liner 61 to rotatively orient the wear taking element relative to the seat so that the ribs 60 fit over and cover the ribs 16.

The valve is arranged in connection with the seat in the manner common to slush pump valves. With my construction the lower section 22 of the valve stem fits the liner 61 while the upper section 22 of the stem is free to be guided through any suitable construction provided in the pump. As the valve operates the head 20 reciprocates relative to the seat and when the valve is closed the lower face 23 of the head engages the packing ring 40 to put sealing compression on it and the load or pressure on the valve is communicated from the head 20 to the seat A through the wear taking element D. The load is distributed over the ring 60 and the ribs 62 so that there is a substantial area active in bearing the load.

With my construction the valve element B is of minimum bulk or weight so that the valve has a minimum impact factor as it operates, and consequently the tendency for the parts to hammer and wear is minimized. However, the principal wear in the structure will occur between the valve head 20 and the ring and ribs of the wear taking element and between the stem 22 and the liner 61, as these are the relatively working or moving parts. By properly relating the materials employed in these parts the greatest portion of the wear can be concentrated on the wear taking element D and when this element has worn excessively it can be readily removed and replaced. By providing a wear taking element that is inexpensive and that can be readily renewed I make it possible for an operator to maintain a valve structure in efficient working condition at little cost and thus operate a pump with maximum efficiency.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A slush pump valve including a seat with an annular body with a top face, a stem guide, and a web supporting the guide spaced centrally in the body, a valve with a head to engage over the face and web and a stem to be guided by the guide, a unitary wear taking member including a ring to engage over and rest on the face, a stationary liner fitting the guide and a web connecting the liner and ring and engaging the web opening upwardly of the seat to rest thereon, and a sealing ring arranged in an annular channel in the face of the seat and retained in the channel by the ring of the wear taking member.

2. A wear taking member for a valve seat with an annular body, a stem guide and a web joining the body and guide including, a ring to rest on the body, a liner to fit into the guide, and a web to rest on the web of the seat and joining the ring and liner, the ring and web of said member being formed of a single sheet of material and the liner being tubular and permanently joined to the web of the said member and depending therefrom.

3. A slush pump valve including, a seat with an annular body having a top face, a central stem guide and ribs extending between and connecting the body and guide, a valve with a head to be supported on said ribs and face and a central depending stem to be guided by the guide, sealing means confined to and supported by the body between the seat and valve, and a unitary wear taking element engaged by the valve including a liner and a ring, the ring being inserted between the face and valve and bearing directly on the face and overhanging the sealing means to hold it to the body and supporting the valve, the liner being inserted between the guide and stem.

4. A slush pump valve including a seat with an annular body with a top face, a stem guide, and a web supporting the guide spaced centrally in the body, a valve with a head to engage over the top face and web and a depending stem to be guided by the guide, and a unitary wear taking member engaged by the valve and including a ring to engage over the top face to rest thereon, a liner fitting in the guide to be stationary therein and a web joined to and connecting the liner and the ring and engaging the web of the seat to rest thereon.

EARL E. CATER.

REFERENCES CITED

The following references are of record in the file of this patent:

UNITED STATES PATENTS

| Number | Name | Date |
| --- | --- | --- |
| Re. 14,424 | Scoville | Jan. 22, 1918 |
| 936,233 | Black | Oct. 5, 1909 |
| 1,650,077 | Lamb | Nov. 22, 1927 |
| 1,882,433 | MacClatchie | Oct. 11, 1932 |
| 1,966,264 | Roye | July 10, 1934 |
| 2,151,442 | Roberts | Mar. 21, 1939 |